(12) United States Patent
Grävingholt et al.

(10) Patent No.: US 11,084,659 B2
(45) Date of Patent: Aug. 10, 2021

(54) TRANSPORT DEVICE

(71) Applicant: KHS GmbH, Dortmund (DE)

(72) Inventors: Stefan Grävingholt, Witten (DE);
Thomas Greiving, Lüdinghausen (DE);
Berthold Paroth, Dortmund (DE);
Zlatko Sarajlija, Dortmund (DE);
Thomas Stienen, Unna (DE)

(73) Assignee: KHS GmbH, Dortmund (DE)

(*) Notice: Subject to any disclaimer, the term of this patent is extended or adjusted under 35 U.S.C. 154(b) by 0 days.

(21) Appl. No.: 16/770,168

(22) PCT Filed: Nov. 26, 2018

(86) PCT No.: PCT/EP2018/082533
§ 371 (c)(1),
(2) Date: Jun. 5, 2020

(87) PCT Pub. No.: WO2019/110351
PCT Pub. Date: Jun. 13, 2019

(65) Prior Publication Data
US 2021/0163227 A1 Jun. 3, 2021

(30) Foreign Application Priority Data
Dec. 8, 2017 (DE) .................. 10 2017 129 292.6

(51) Int. Cl.
*B65G 21/06* (2006.01)
*B65G 21/22* (2006.01)
*B65G 15/62* (2006.01)

(52) U.S. Cl.
CPC .............. *B65G 21/06* (2013.01); *B65G 15/62* (2013.01); *B65G 21/22* (2013.01); *B65G 2812/02069* (2013.01)

(58) Field of Classification Search
CPC ........ B65G 21/06; B65G 21/22; B65G 15/62; B65G 2812/02069
See application file for complete search history.

(56) References Cited

U.S. PATENT DOCUMENTS

| 3,595,380 A | 7/1971 | Miller |
| 6,269,939 B1 | 8/2001 | Lapeyre et al. |
| (Continued) | | |

FOREIGN PATENT DOCUMENTS

| CN | 1443131 A | 9/2003 |
| CN | 103180120 A | 6/2013 |
| (Continued) | | |

OTHER PUBLICATIONS

"Description EP3020659", Patent Translate, EPO and Google. (Year: 2021).*

*Primary Examiner* — Mark A Deuble
(74) *Attorney, Agent, or Firm* — Occhiuti & Rohlicek LLP

(57) ABSTRACT

A transport device includes an entry finger that guides a conveyor as it carries items thereon in a transport direction from the rear deflector to the front deflector. The conveyor slides along a sliding strip that is supported by a profile element that is supported by a support. The entry finger guides the conveyor around the front deflector, where the conveyor reverses direction. The entry finger couples to the transport device by a detachable connection. The detachable connection is either a locking connection that connects the entry finger to the sliding strip, an insertion connection that connects the entry finger to the profiled element, or a detachable connection formed by a quick fastener between the support and the profiled element and the finger.

20 Claims, 7 Drawing Sheets

(56) References Cited

U.S. PATENT DOCUMENTS

| | | | |
|---|---|---|---|
| 9,522,785 B1 | 12/2016 | Rottier et al. | |
| 9,555,973 B2* | 1/2017 | Oude Roelink | B65G 41/006 |
| 2002/0063044 A1 | 5/2002 | Reatti | |
| 2007/0017786 A1* | 1/2007 | Hosch | B65G 21/105 |
| | | | 198/841 |
| 2009/0008225 A1* | 1/2009 | Call | B65G 21/06 |
| | | | 198/860.1 |
| 2011/0017573 A1* | 1/2011 | Karpy | B65G 15/62 |
| | | | 198/497 |
| 2016/0355347 A1* | 12/2016 | Rottier | F16B 2/12 |
| 2017/0183163 A1* | 6/2017 | Von Birgelen | B65G 21/22 |
| 2019/0185271 A1* | 6/2019 | Stephenson | B60S 3/004 |
| 2020/0010276 A1* | 1/2020 | Dudek | B65G 15/62 |
| 2020/0332813 A1* | 10/2020 | Gravingholt | F16B 7/20 |

FOREIGN PATENT DOCUMENTS

| | | |
|---|---|---|
| DE | 3816601 A1 | 3/1989 |
| DE | 19637353 C2 | 10/2002 |
| DE | 102014222459 A1 | 5/2016 |
| EP | 2835328 A1 | 2/2015 |
| EP | 3020659 A1 | 5/2016 |
| FR | 1310053 A | 3/1963 |
| JP | S58144524 U | 9/1983 |
| WO | 0132534 A1 | 5/2001 |

* cited by examiner

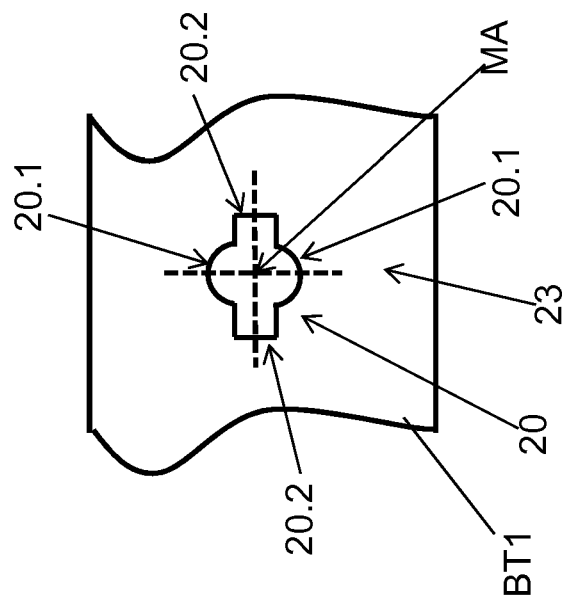
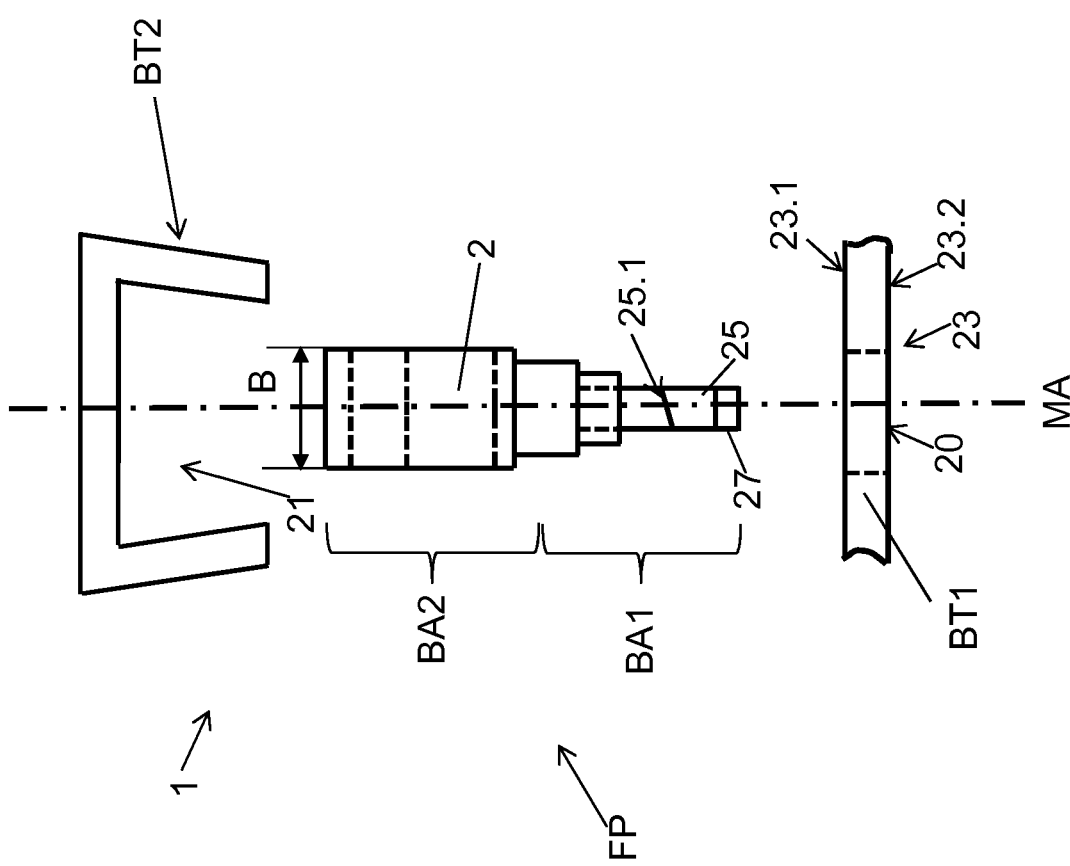
Fig. 6a
Fig. 6b

TRANSPORT DEVICE

RELATED APPLICATIONS

This is the national stage of international application PCT/EP2010/082533, filed on Nov. 26, 2018, which claims the benefit of the Dec. 8, 2017 priority date of German application DE 10-2017-129-292.6, the contents of which are herein incorporated by reference.

FIELD OF INVENTION

The invention relates to a transport device for transporting transport goods in a transport direction

BACKGROUND

In the beverage industry, there exist machines for transporting items, such as containers. These machines usually rely on one or more conveyor belts to transport as many as 10,000 or sometimes 50,000 items per hour.

Transport devices typically have a machine frame on which the conveyor belts are guided. These frames are usually made by combining individual frame structures. A typical frame structure has a support body and conveyor supports upon which the conveyor belts slide. A low-friction layer on the conveyor supports reduces wear on the conveyor belts.

SUMMARY

In one aspect, the invention features a transport device for the transporting of transport goods in a transport direction, comprising at least one machine frame, on which at least one transport element is arranged, which forms a loop and is driven such as to circulate, wherein the transport element is guided over a deflection apparatus that is arranged towards the front with respect to the transport direction, and a deflection apparatus that is arranged towards the rear with respect to the transport direction, wherein a transport line for the transport goods is formed by the at least one transport element between the front deflection apparatus and the rear deflection apparatus, wherein the at least one transport element is guided as it slides on at least one sliding strip at least along the transport line, wherein the at least one sliding strip is arranged on at least one profiled element at least in some sections along the transport line, which profiled element is connected to at least one support body of the machine frame, wherein the at least one transport element is guided by at least one entry finger at least in some sections at least in the region of transition from the front deflection apparatus onto the at least one sliding strip, which entry finger is detachably connected to the sliding strip and/or the profiled element, wherein the detachable connection of the at least one entry finger to the at least one sliding strip is designed as a locking connection and/or the detachable connection of the at least one entry finger to the at least one profiled element is designed as an insertion connection, and/or the at least one entry finger and the at least one profiled element are detachably connected to the at least one support body by means of a quick-fastening apparatus.

In some embodiments, provision is made for the entry finger to comprise at least one guide section, which on its upper side forms a contact surface for the sliding transition of the transport element from the front deflection apparatus to the at least one sliding strip.

In some embodiments, provision is made for the guide section, on its free face side facing towards its front end, to be configured as rounded and/or oblique shaped.

In some embodiments, provision is made for the entry finger to comprise a standing contact section which connects immediately adjacent to the guide section, wherein the standing contact section comprises at least one locking element for forming the locking connection between the entry finger and the sliding strip, in such a way that the standing contact section is therefore configured to be the lockable contact surface of a sliding strip.

In some embodiments, provision is made for the locking element to be configured such as to engage into a locking opening provided in the sliding strip, in such a way that the locking element can be guided into the locking opening and then locks in a locked position.

In some embodiments, provision is made for the entry finger to comprise a reception section, in turn adjacent and connecting to the standing contact section, which forms the insertion connection for the detachable insertion reception of a profiled element.

In some embodiments, provision is made for the insertion connection to be configured such that the outer geometry of the reception section is adjusted to the inner geometry of the profiled element in such a way that the reception section can be received in positive fit by the profiled element which is inserted onto it.

In some embodiments, provision is made for the reception section, the standing contact section, and the guide section in each case to be provided as mutually offset, in the form of steps, and that a stop surface is provided in the respective transition region.

In some embodiments, provision is made for the entry finger to comprise an insertion section, in turn adjacent and connecting to the reception section, by means of which the entry finger can be detachably connected to the quick-fastening apparatus, wherein the detachable connection of the detachable connection of the quick-fastening apparatus to the entry finger is configured as non-positive and/or positive.

In some embodiments, provision is made for the at least one quick-fastening apparatus for the detachable connection of the profiled element to the basic support to be configured as adjustable between a locking position and a release position, and specifically in such a way that the quick-fastening apparatus in the locking position connects the profiled element securely but detachably to the basic support, and in the release position releases it again.

In some embodiments, provision is made for the quick-fastening apparatus to be configured as adjustable between a locking position and a release position, and specifically in such a way that the quick-fastening apparatus in the locking position connects the profiled element securely but detachably to the basic support, and in the release position releases it again, i.e. detaches it.

In some embodiments, provision is made for the quick-fastening apparatus in each case to comprise a securing section, extending along a middle longitudinal axis of the quick-fastening apparatus and mutually opposing one another, with which the profiled element and/or the basic support can be connected.

In some embodiments, provision is made for the first and/or second securing section to be configured for non-positive and/or positive fit connection in the locking position of the quick-fastening apparatus.

In some embodiments, provision is made for the first and/or second securing section, in the locking position, to be inserted into the profiled element and/or the basic support, and, in particular, into a prepared perforation of the basic support and/or a cut-out opening of the profiled element.

In some embodiments, provision is made for the first and/or second securing section, in the locking position, to be snapped into the profiled element and/or into the basic support.

In some embodiments t, provision is made for the first and/or second securing section in the locking position to be securely connected to the profiled element and/or the basic support, in that the first and/or second securing section engage with a locking element engage behind the perforation in the basic support and/or the cut-out opening of the profiled element.

In some embodiments, provision is made for the quick-fastening apparatus to be configured such as to be rotatable about a middle longitudinal axis between a locking position and a release position.

In some embodiments, provision is made for the quick-fastening apparatus to be configured as a rotating locking apparatus, which in the locking position creates a non-positive and/or positive connection.

In some embodiments, provision is made for the quick-fastening apparatus to comprise, in the first securing section, a first locking section on the free-end side, and, in the second securing section, a second locking section on the free-end side, that the basic support comprises, for providing a detachable meshing securing effect, in at least one section, which is itself flat at least in some sections, a perforation or opening which deviates from the circular shape, of which the cross-section is adjusted to the longitudinal section of the first locking section, and specifically in such a way that the first locking section can be introduced through the perforation, and the quick-fastening apparatus, by rotation about the middle longitudinal axis, can be secured by meshing engagement with the first securing section at the profiled element, and that the profiled element comprises at least one profiling section, forming a cut-out opening, of which the cross-section is adjusted to the cross-section of the second locking section, and specifically in such a way that, for the detachable meshing securing of the first securing section to the profiled element, by rotation of the second locking section about the middle longitudinal axis, the second locking section can be received, at least in sections, in positive fit in the cut-out opening.

In another aspect, the invention features a transport device, said transport device comprising a conveyor, a front deflector, a rear deflector, a sliding strip, a profiled element, a support, and an entry finger. The conveyor forms a loop that is driven to circulate so as carry items thereon in a transport direction from the rear deflector to the front deflector. The conveyor changes its direction of travel as it is guided over the rear deflector and the front deflector. The sliding strip is on the profiled element. The conveyor slides along the sliding strip. The profiled element connects to the support. The entry finger guides the conveyor around the front deflector. The entry finger is coupled to the transport device by a detachable connection that is selected from the group consisting of a first connection, a second connection, and a third connection. The first connection is a locking connection that connects the entry finger to the sliding strip. The second connection is an insertion connection that connects the entry finger to the profiled element. The third connection is a detachable connection formed by a quick fastener between the support and the profiled element and the finger.

The expressions "essentially" or "approximately" signify in the meaning of the invention deviations from the respective exact value by +/−10%, preferably by +/−5%, and/or deviations in the form of changes which are not of significance for the function.

To a layperson who is not well versed in the art, the term "quick fastener" would seem subjective because "quick" is a relative term. Regrettably, this is, in fact the term used by those in the art to describe a particular type of fastener. Thus, the term "quick fastener" should be construed as a whole as being the particular type of fastener that is understood by those in the art. One who construes it by taking it apart into its individual components, i.e., "quick" and "fastener," would therefore be construing it in a manner that is inconsistent with the specification.

Further embodiments, advantages, and possible applications of the invention also derive from the following description of exemplary embodiments and from the Figures. In this context, all the features described and/or represented as illustrations are in principle the object of the invention, individually or in any desired combination, and regardless of their inclusion in the claims or reference to them. The contents of the claims are also deemed a constituent part of the description.

BRIEF DESCRIPTION OF THE DRAWINGS

The invention is explained hereinafter in greater detail on the basis of figures by reference to exemplary embodiments. The figures show:

FIG. 6a is a view of a quick fastener in its release position;
FIG. 6b is a plan view of a perforation through a support;
FIG. 7a is a perspective view of a quick fastener;
and
FIG. 7b is a side view of the quick fastener of FIG. 7a.

In the figures, identical reference numbers are used for the same elements, or for elements with the same effect. Moreover, for the sake of easier overview, each figure includes only those reference numbers that are needed for an understanding of that figure.

DETAILED DESCRIPTION

Figure 1:
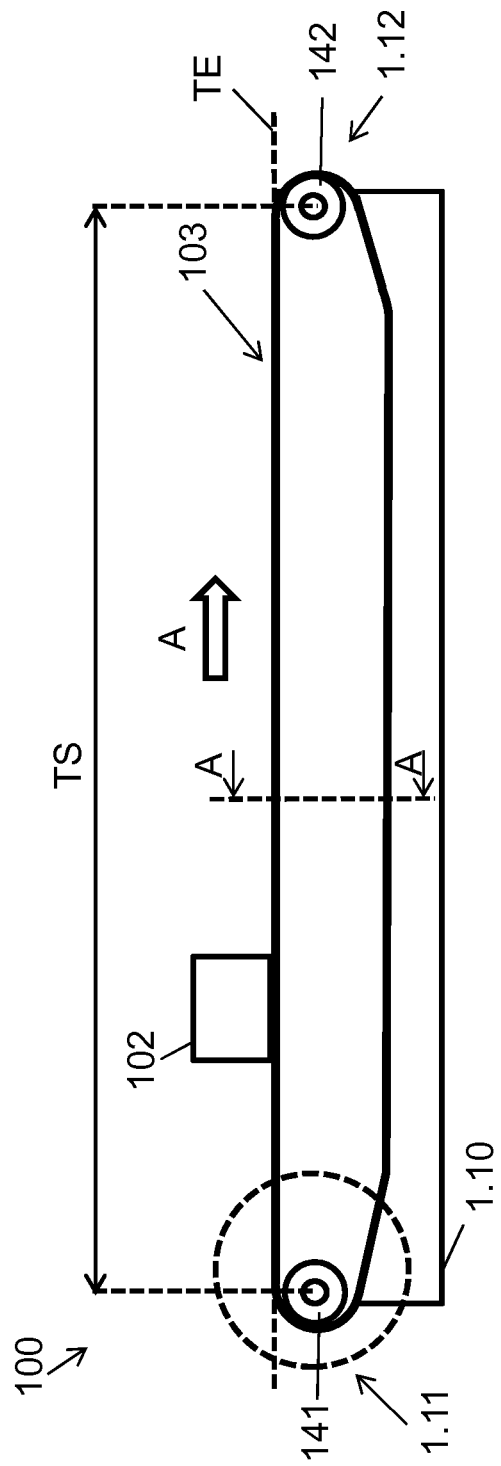
FIG. 1 shows a side view of a transporter for transporting piece goods.

FIG. 1 shows a transporter 100 that transports items 102 in a transport direction "A" between various points, such as container treatment machines, forwarding stations, transfer stations, and handover stations. The illustrated transporter 100 preferably transports more than 10,000 items 102 per hour and preferably more than 50,000 items 102 per hour.

The transporter 100 includes a conveyor 103. The conveyor 103 is a closed loop that is driven to circulate endlessly in the transport direction A. The conveyor 103 has upper and lower lengths or "strands" that move along a transport line TS. The upper length moves in the transport direction A along the transporter's feed strand and the lower length moves opposite that direction along the transporter's return strand.

Suitable implementations of the conveyor 103 include a transport belt, a transport chain, a hinged band chain, and a transport mat. A sliding strip 113 supports the upper length of the conveyor so that it slides on the sliding strip 113 as it moves in the transport direction A.

The conveyor's upper length forms a horizontal transport plane TE on which items 102 stand on their respective bases. In some embodiments, several conveyors 103 arranged beside each other form rows.

The transporter 100 has a front end 1.11 and a rear end 1.12. Along the upper length, or feed strand, the conveyor 103 moves from the rear end 1.12 towards the front end 1.11. When it reaches the front end 1.11, a front deflector 141 deflects it so that, along the return strand, the conveyor 103 moves in the opposite direction. Upon reaching the read end 1.12, a rear deflector 142 deflects it again so that it now moves towards the front end 1.11.

The front and rear deflectors 141, 142 are typically driven by a motor. Examples of a suitable motor include an electric motor, and in particular, a gearless electric motor, examples of which include a stepping motor, a servomotor, and a torque motor.

Figure 4:
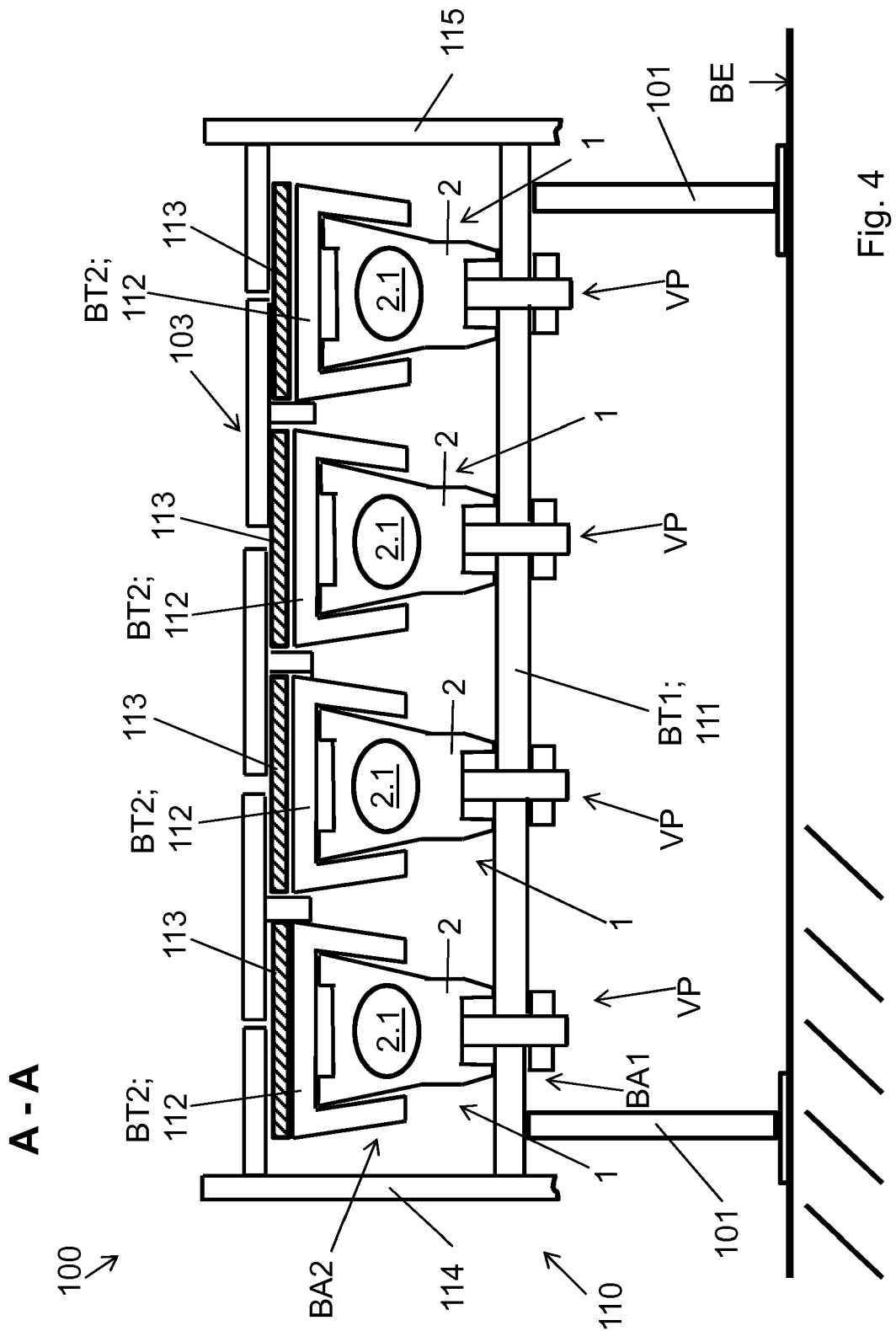
FIG. 4 is a view along the line "A" form FIG. 1.

Referring to FIG. 4, a frame 110 forms a frame structure that accommodates all the transport device's components. Legs 101 support the frame 110 on a ground plane BE.

FIG. 4 shows a support 111 that extends across the frame 110 and hence across the entire width available for conveying items 102. The support 111 is typically a U-profiled beam made of a particularly strong steel.

FIG. 4 also shows a profiled element 112 connected to the support 111. A sliding strip 113 rests on the profiled element 112. The sliding strip 113 is one of many sliding strips 113 that extend along the transport line TS.

Figure 2:
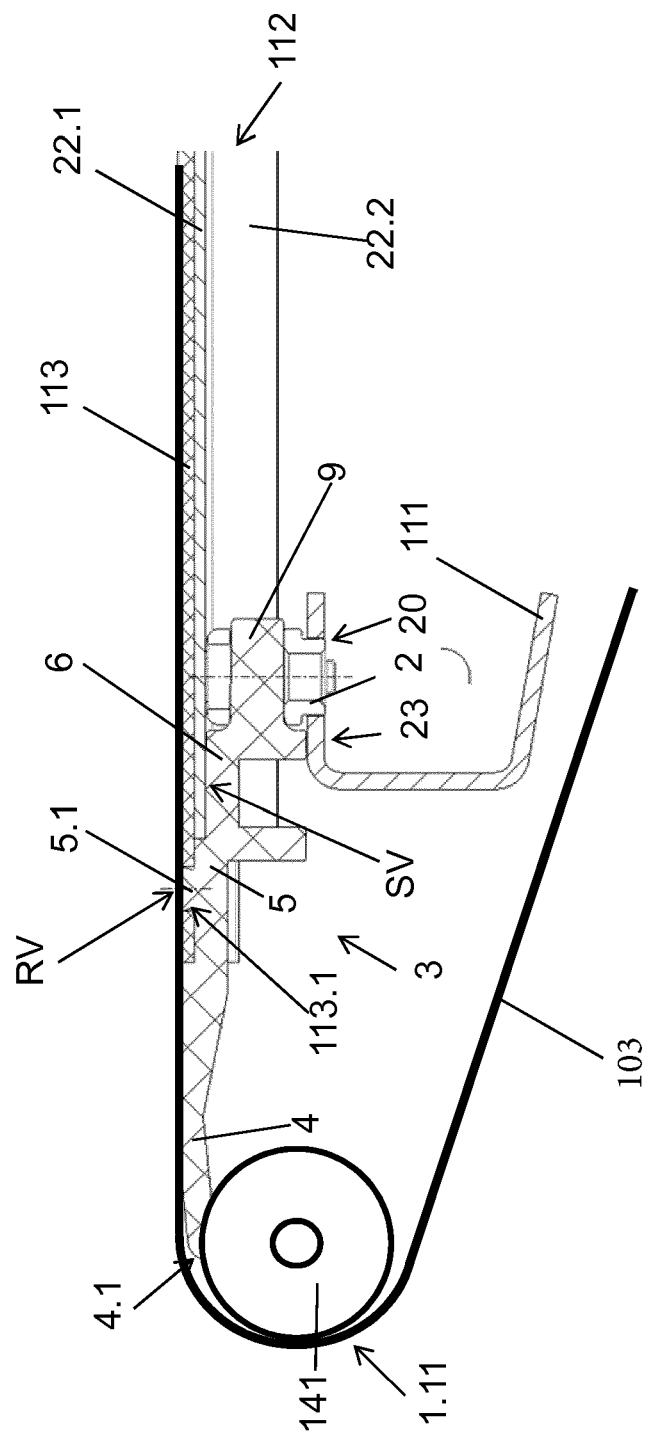
FIG. 2 shows details within the circled region of FIG. 1.

In a preferred embodiment, there are at least two or even more supports 111 distributed along the transport line's length, preferably at regular intervals. In each case, the legs 101 bear the load of the support 111. As shown in FIG. 2, there is typically a support 111 in the region of the front end 1.11. There is also another support 111 in the region of the rear end 1.12.

As shown in FIG. 2, the support body 111 has a U-shaped profile in which an upper limb forms a flat surface section 23 having a non-circular perforation 20. As shown in FIG. 6b, the perforation 20 comprises two identical arcuate sections 20.1 and two identical rectangular sections 20.2. As shown in FIG. 4, the support body 111 has several of these perforations 20. Each perforation 20 is under a corresponding one of the sliding strips 113.

The sliding strips 113 form a plane that is parallel to the transport plane TE. A conveyor 103 slides on each sliding strip 111 along the transport line TS. A typical transporter 100 has several such sliding strips 113 that extend along the entire transport line TS. As shown in FIG. 4, it is possible to have several sliding strips 113 side-by-side. It is also possible for several sliding strips 113 to be joined end-to-end along the transport line TS. In either case, the sliding strips 113 are flush with each other.

Each sliding strip 113 has an upper side that faces the conveyor 103. This upper side is a surface with a low friction coefficient. A suitable material for making this surface is a plastic.

FIG. 4 shows a profiled element 112 having a C-shaped cross section in which a middle limb 22.1 joins a pair of side limbs 22.2, with the sliding strip 113 resting on the middle limb 22.1. The side limbs 22.2 are oriented so that instead of pointing straight down, they both point inwards, thus forming an angle of less than ninety degrees relative to a line defined by the middle limb 22.1. As a result, if lines bisecting each side limb 22.2 were drawn and extended past free ends 22.3 of the side limbs 22.2, they would intersect at an acute angle.

The middle limb 22.2 and the two side limbs 22.2 delimit a cut-out opening 21 that opens downwards in the direction of the support body 111. The cut-out opening 21 forms a groove having a cross-section shaped like a downwardly pointing truncated cone whose base corresponds to the middle limb 22.2.

A direction perpendicular to the transport direction "A" but in the transport plane TE defines a transverse direction. The middle-limb section's width along this transverse direction matches that of a sliding strip 113. From above, the sliding strip 113 is rectangular having a length, in the transport direction A, that matches that of the profiled element 112. In some embodiments, the profiled element 112, and in particular its middle limb 22.1, is also rectangular when viewed from above.

Referring now to FIG. 2, an entry finger 3 guides the conveyor 103 as it approaches the front deflector 141. The entry finger 3 defines a transition that reduces wear on those portions of the conveyor 103 that transition between being on the feed strand and being on the return strand. In a preferred embodiment, the entry finger 3 is a single piece. To facilitate replacement resulting from wear, the entry finger 3 connects to a sliding strip 113 or to a profiled element 112 or to both in such a way that it remains possible to detach the entry finger 3.

A connection connects the entry finger 3 to the sliding strip 113. This connection includes either a locking connection RV or a detachable connection at the profiled element 112 that is configured as an insertion connection SV. Alternatively, a quick fastener 2 connects the profiled element 112 to the support 111 in such a way that it remains simple to detach.

Figure 3:
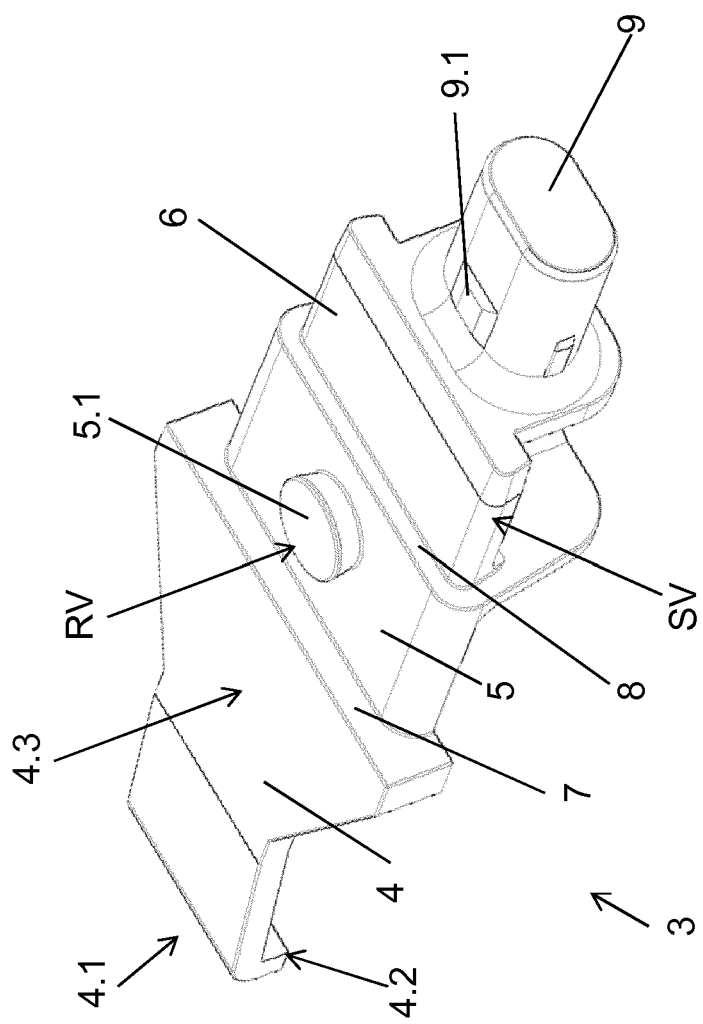
FIG. 3 is a perspective view of a released entry finger.

Referring now to FIG. 3, the entry finger 3 includes a guide section 4 that forms a transitional surface between the sliding strip 113 and the front deflector 141. An upper side of the guide section 4 forms a contact surface 4.3 for the conveyor 103 to slide along as it approaches the front deflector 113. This contact surface 4.3 is made of a material having a low coefficient of friction, such as a plastic.

The guide section's free end forms a rounded surface 4.2, best seen in FIG. 3, that slopes downward around the front deflector 141 until it points vertically downward towards the ground plane BE. Between them is a rounded transitional surface 4.1.

The entry finger 3 also includes a contact section 5 that forms a connection between the entry finger 3 and the sliding strip 113. The contact section 5 features a holding element, such as a lock 5.1 that establishes a locked connection RV between the sliding strip 113 and the entry finger 3.

Referring back to FIG. 2, the lock 5.1 engages a lock opening 113.1 in the sliding strip 113. The lock opening 113.1 is either a blind hole or a hole that passes through the strip 113. In some embodiments, the lock 5.1 forms a truncated cone whose outer circumferential surface matches an inner circumferential surface of the lock opening 113.1 in such a way that the lock 5.1 engages the lock opening 113.1 in a locking position.

As can be seen in both FIGS. 2 and 3, the entry finger 3 includes a receiving section 6 that is adjacent to the contact section 5. The receiving section 6 receives an inserted profiled element 112 in such a way that the two remain detachable from each other. This results in a detachable connection SV.

Figure 5:
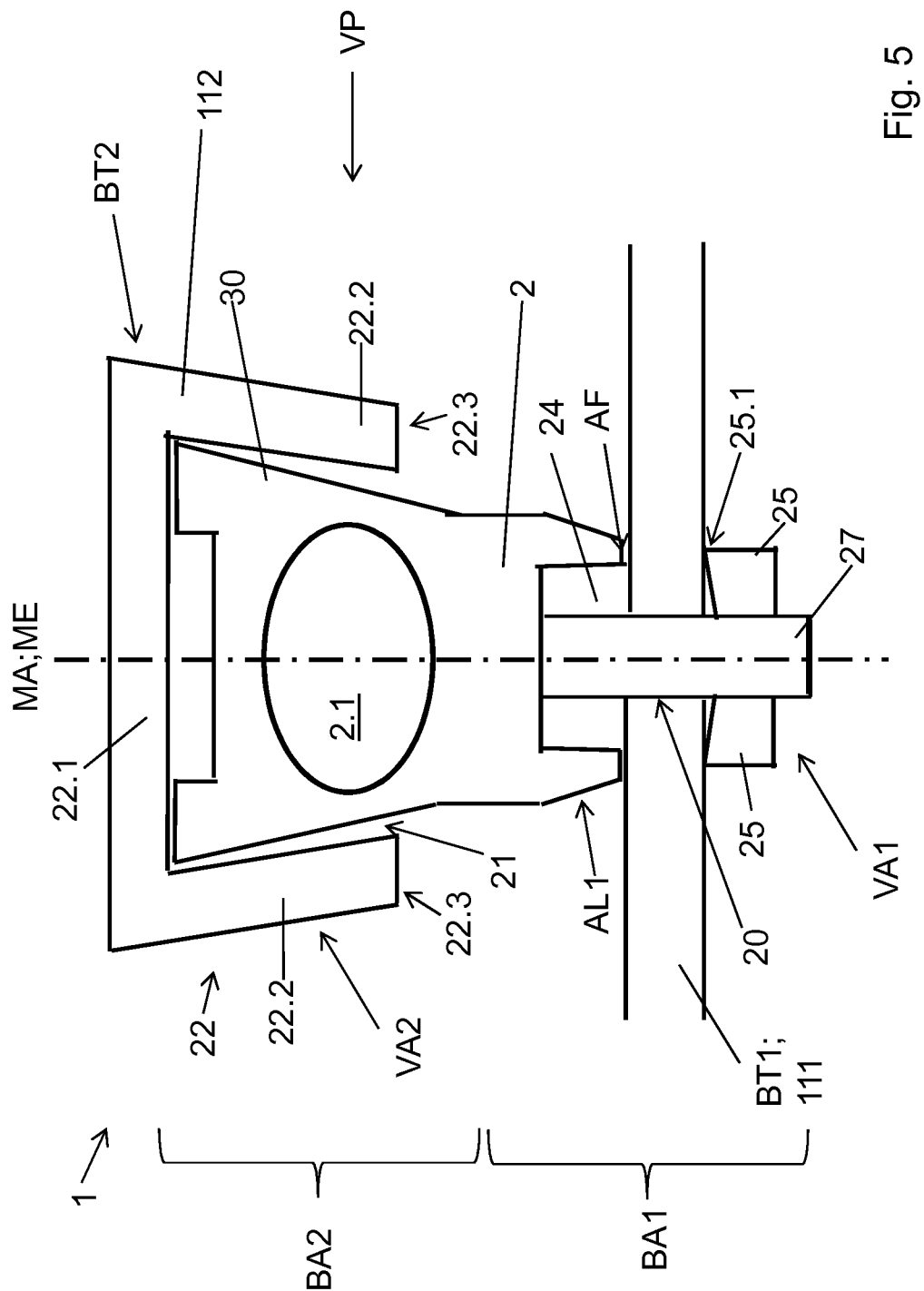
FIG. 5 is a side view of a quick fastener in its locking position.

The detachable insertion connection SV of the entry finger 3, and in particular, of its receiving section 6, is such that the outer geometry of the receiving section 6 and the profiled element 112 form a positive fit. In some embodiments, this is achieved by having the profiled element's cross section be C-shaped, as shown in FIGS. 4 and 5.

Referring again to FIG. 3, the receiving section 6, the standing contact section 5, and the guide section 4 are vertically offset from each other to form steps. These steps define first and second stop surfaces 7, 8. The first stop surface 7 is formed between the guide section 4 and the contact section 5 for a sliding strip 113 arranged on the contact section 5. The second stop surface 8 is between the receiving section 6 and the contact section 5. This is formed for a profiled element 112 positioned in positive fit onto the receiving section 6.

In some embodiments, the entry finger 3 includes an insertion section 9 that connects to the adjacent receiving section 6. This permits the entry finger 3 to be detachably connected to the quick-fastener 2. Embodiments include those in which this connection forms a positive fit and those in which it forms a non-positive fit.

The quick fastener 2 includes a receiver 2, which is typically a cut-out opening. In some embodiments, the opening penetrates all the way through a clamping body 30 of the quick fastener 2. An insertion section 9 inserted into this receiver 2.1 forms a positive fit or a non-positive fit. In the former case, the insertion section's geometry matches that of the receiver 2 so as to produce the positive fit.

In some embodiments, the insertion section 9 also includes a locking nose 9.1. The locking node 9.1 locks into the cut-out opening 2.1. As a result, in addition to the positive fit connection, there exists a non-positive connection established between the entry finger 3 and the quick fastener 2. Preferably, the insertion section 9 has a length that matches at least the width of the quick fastener 2 in the region of the cut-out opening 2.1.

The quick fastener 2 transitions between a locking position VP and a release position FP. In the locking position VP, the quick fastener 2 securely connects the profiled element 112 to the basic support 111 but in such a way that detachment remains possible. In the release position FP, the two are detached.

Referring now to FIG. 5, the quick fastener 2 includes opposed first and second securing sections BA1, BA2 that extend along the quick fastener's axis MA. These securing sections BA1, BA2 connect the profiled element 112 to the support 111. The first securing section BA1 connects to the profiled element 112 and the second securing support BA2 connects to the basic support 111. In some embodiments, the connection is a non-positive fit. In others, it is a positive fit.

In some embodiments, the first and/or second securing sections BA1, BA2, in the locking position VP, are inserted into the profiled element 112 and/or the support 111. In particular, the first and/or second securing sections BA1, BA2, in the locking position VP, can be inserted into the support's perforation 20 of the support 111 and/or into the profiled element's cut-out opening 21.

In other embodiments, the first and/or second securing section BA1, BA2, in the locking position VP, are snapped into the profiled element 112 and/or into the support 111. Among these are embodiments in which the first and/or second securing section BA1, BA2 includes a locking element that, in the locking position VP, snaps into the perforation 20 and/or the cut-out opening 21.

In yet other embodiments, the first and/or second securing sections BA1, BA2, in the locking position VP, securely connect to the profiled element 112 and/or to the support 111 in such a way that the first and/or second securing sections BA1, BA2, engage a locking element 25 behind the support's perforation 20 and/or the profiled element's cut-out opening 21.

In some embodiments, the quick fastener 2 rotates about its axis MA between a locking position VP and a release position FP in such a way that, in the locking position VP, the quick-securing apparatus 2 connects the profiled element 112 securely, but detachably, with the basic support 111, and in the release position releases it again, i.e. detaches it. Among these are embodiments in which the quick fastener 2 is a rotating locking apparatus that, in the locking position VP establishes connection. In some embodiments, the connection is a non-positive connection. In others, it is a positive connection.

FIG. 4 shows several quick fasteners 2, each of which has its first securing section BA1 detachably connected to a common support 111 and each of which has its second securing section BA2 connected to a profiled element 112. A sliding strip 113 spans the upper side of the respective profiled elements 112. A locking connection RV detachably connects the sliding strip 113 to its profiled element 112. The conveyor 103 lies on the sliding strips 113 so as to slide over the upper side during operation. The transporter 100 also includes right and left frame plates 114, 115 on either side of the support 111 to guide the conveyor 103. In some embodiments, the profiled elements 112, and/or the sliding strips 113, and/or the frame plates 114, 115 extend over the entire length of the transport line TS and can be formed either as one piece or as separate pieces.

FIG. 5 shows a quick fastener 2 in a locking position VP in which it detachably connects the profiled element 12 is to the support 111. In the side view represented in FIG. 5, the quick fastener 2. spans a middle plane ME that contains the middle longitudinal axis MA and that is oriented perpendicular to the plane of the drawing.

In FIG. 5, the first securing section BA1 detachably connects to the support 111 and the second securing section BA2 detachably connects to the profiled element 112 such that the support 111 and the profiled element 112 can be connected to one another, the former by the first securing section BA1 and the latter by the second securing section BA2.

The first securing section BA1 comprises a first locking section VA1 on a free-end side thereof and the second securing section BA2 comprises a second locking section VA2. The first locking section VA1 engages the support 111 and the second locking section engages the profiled element 112. The second securing section BA2 comprises a second locking section VA2 for holding by means of which the support 111 is held securely in the locking position VP, and in the respective release position FP is detached by the quick fastener 2, i.e. is released.

The support 111 comprises a flat surface section 23 having a non-circular perforation 20. As shown in FIG. 6b, the perforation 20 comprises two identical arcuate sections 20.1 and two identical rectangular sections 20.2. The cross-section of the first locking section VA1 is such that it VA1 can be introduced through the perforation 20. Once inserted, rotation of the quick fastener 2 about the middle longitudinal axis MA secures and clamps the first securing section BA1 to the support 111.

Referring back to FIG. 5, the first securing section BA1 includes a first contact section AL1 adjacent to the second securing section BA2. The first contact section AL1 forms a receiving groove 24 that extends perpendicular to the middle longitudinal axis MA.

The receiving groove 24 extends along at least part of the circumference of a circle centered at the middle longitudinal axis MA, though in a preferred embodiment, it extends all the way around such a circle's circumference. The groove 24 forms, at the surface section facing towards the support 111, a contact surface AF for the profiled element 112 in the locking position VP. In particular, the receiving groove's dimensions are adjusted to the perforation 20 in such a way that, in the locking position VP, the receiving groove 24 does not pass through the perforation 20. Instead, it is supported at the flat section 23 on the side facing towards the second securing section BA2, at least over part of the circumference about the perforation 20, on the flat section 23.

Referring now to FIG. 6a, the first securing section's locking section VA comprises a longitudinal extension 27 that coaxially surrounds the middle longitudinal axis MA. The extent to which it extends depends on the support's thickness.

A locking element at a distal end of the longitudinal extension 27 extends radially outward from the middle longitudinal axis MA and forms a locking finger. Some embodiments feature two such locking elements 25 extending from opposite sides.

An upper side of the locking element 25 forms a contact surface 25.1 that faces the second securing section BA2. The contact surface 25.1 is oriented obliquely to form an acute angle relative to the longitudinal axis MA, as can be seen in FIG. 6a.

To enter the locking position VP, the locking element 25 is guided through the perforation 20 and rotated relative to the support 111 by some angle, which is preferably about 40°, from the release position FP into the locking position VP. This engages the locking element 25 behind the perforation 20. The side of the flat section 23 that faces away from the first securing position BA1 supports the locking element 25 against an upward axial force.

Rotating the first locking section VA1 causes the contact surface 25.1 to contact the flat section 23 on the side facing away from the second securing section BA2. This causes the flat section 23 to press against the contact surface AF of the receiving groove 24. As a result, the flat section 23 is clamped between the contact surface AF and the oblique contact surface 25.1.

As shown in FIG. 6b, the perforation is a mirror-symmetric perforation having two arcuate sections 20.1 and two rectangular sections 20.1 that are configured such that the first it is possible to pass the locking section 25 through the rectangular sections 20.2 and to then be rotated by ninety degrees so that the arcuate sections 20.1 block its withdrawal through the perforation 20. A suitable way to make the perforation 20 is by laser-cutting, punching, or drilling.

The flat section 23 has a flat upper side 23.1 and a flat underside 23.2. As such, the upper side 23.1 and underside 23.2 span parallel planes so that the flat surface 23 has constant thickness. This results in constant surface strength.

Referring back to FIG. 5, the profiling section 22 forms a cut-out opening 21 whose cross section is such that rotating the second securing section BA2 causes the second locking section VA2 to engage at least sections of the walls of the cut-out opening 21. In some embodiments, this results in a positive fit. In others, it results in or a non-positive fit.

Figures 7A, 7B:
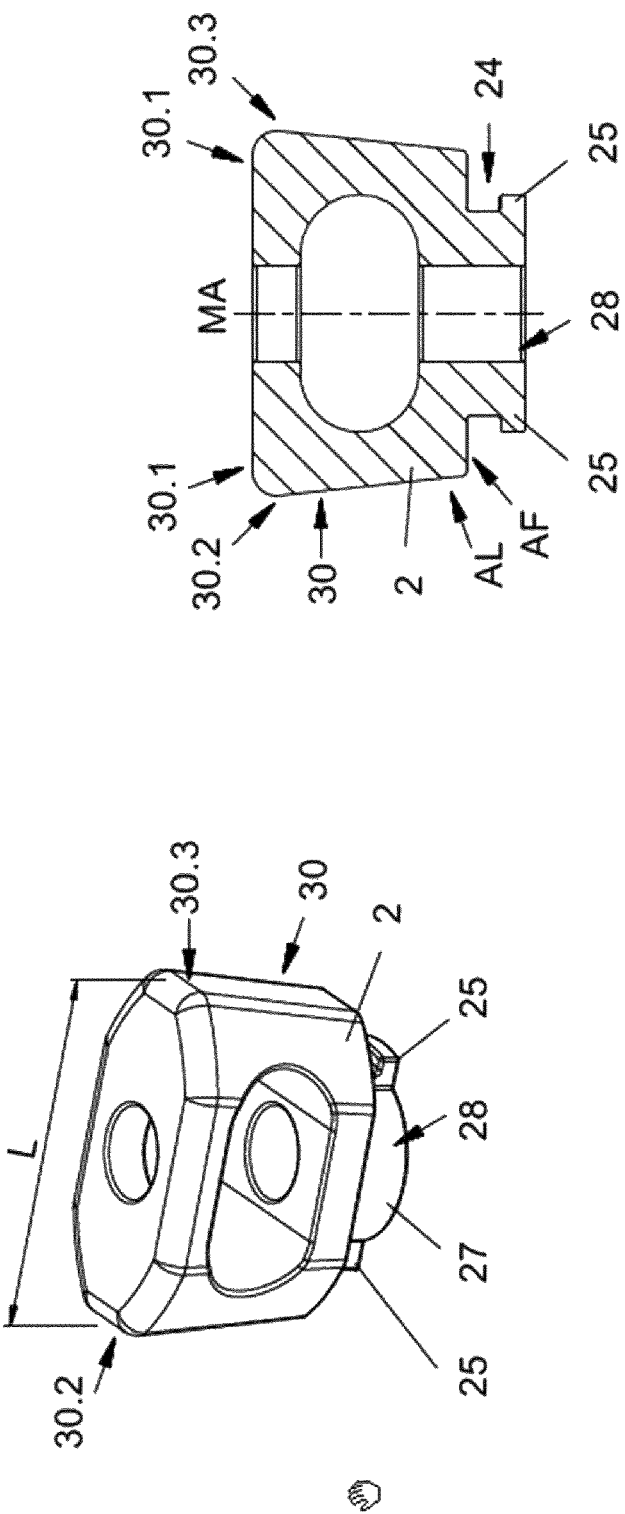

Referring now to FIG. 7a, the quick fastener's second locking section VA2 includes a clamping body 30 that is essentially oval as seen from above and that tapers in the direction of the first securing section BA1. As a result, that the clamping body 30 tapers so that its free end section 30.1, which faces the second component BT2, has the greatest length L in the lateral cross-section of its locking position VP.

The clamping body 30 comprises straight contact surfaces 30.2, 30.3 on two sides that preferably oppose each other in the region of the free end section 30.1. When the clamping body 30 is in its locking position VP, these cause the lateral limbs 22.2 to splay out and form a clamp seat. It is preferable in such embodiments for the lateral limbs 22.2 to be elastically deformable so that after having been outwardly deflected, they can resiliently recover their original form in such a way that, when the contact surfaces 30.2, 30.3 of the clamping body 30 are rotated outwards from the release position FP into the locking position VP, i.e. directed away from the mid-plane ME, they are deflected, i.e. their form gives in a resilient manner. Between the release position FP and the locking position VP, the quick fastener's second locking section VA2 rotates by preferably 40° relative to the profiling section 22.

FIG. 5 shows the locking position VP while FIG. 6a shows the release position FP.

In a preferred embodiment, the quick fastener 2 is a unitary structure formed as only one piece. As a result, a rotation of its second securing section BA2 also rotates its first securing section BA1. In other embodiments, the first and second securing sections BA1, BA2, either in a non-positive fit or in a positive fit. This too permits rotation of the first and second securing sections BA1, BA2 at the same time.

The clamping body's width B is such that it can be introduced into the cut-out opening 21.

The clamping body's length L along the line separating the opposing contact surfaces 30.2, 30.3 is such that the clamping body 30 is able to splay the corresponding inner sides of the two lateral limb sections 22.2 to create a clamp seat. Additionally, rotation of the clamping body 30 from the release position FP into the locking position VP causes it to be pressed and to come into contact with the underside of the middle limb 22.1. This results in a defined location of the quick fastener 2 relative to the profiling element 112 can be established. The clamping body's length L and width B are thus adjusted to the profiling section 22, in particular to the dimensioning of the middle and side limbs 22.2 thereof.

In some embodiments, such as that shown in FIGS. 7a and 7b, an opening 28 forms a passage through the quick fastener 2. A tubular section 27 of the opening 28 has a hexagonal cross-section. This provides an engagement surface for a tool, such as a hexagonal wrench. As a result, it becomes possible to use a tool to rotate the quick fastener 2 between its release position FP and its locking position VP.

The invention has been described heretofore by way of exemplary embodiments. It is understood that numerous modifications and derivations are possible without thereby departing from the inventive concept underlying the invention.

The invention claimed is:

1. An apparatus comprising a transport device, said transport device comprising a conveyor, a front deflector, a rear deflector, a sliding strip, a profiled element, a support, and an entry finger, wherein said conveyor forms a loop that is driven to circulate so as carry items thereon in a transport direction from said rear deflector to said front deflector, wherein said conveyor changes its direction of travel as it is guided over said rear deflector and said front deflector, wherein said sliding strip is on said profiled element, wherein said conveyor slides along said sliding strip, wherein said profiled element connects to said support, wherein said entry finger guides said conveyor around said front deflector, wherein said entry finger is coupled to said transport device by a detachable connection that is selected from the group consisting of a first connection, a second connection, and a third connection, wherein said first connection is a locking connection that connects said entry finger to said sliding strip, wherein said second connection is an insertion connection that connects said entry finger to said profiled element, wherein said third connection is a detachable connection formed by a quick fastener between said support and said profiled element and said finger, wherein said quick fastener is adjustable between a locking position and a release position, wherein, in said locking position, said quick fastener connects said profiled element securely but detachably to said support, and wherein, in said release position, said profiled element an said support are released from each other.

2. The apparatus of claim 1, wherein the entry finger comprises a guide section having an upper side that forms a contact surface that provides the conveyor with a transition of between the front deflection apparatus and the sliding strip.

3. The apparatus of claim 1, wherein said transporter has a front end, wherein the guide section comprises a free-face side that faces said front end, and wherein said free face side is rounded.

4. The apparatus of claim 1, wherein said quick fastener comprises first and second opposed securing sections, extending along a middle longitudinal axis of said quick fastener for connecting to said profiled element and said support.

5. The apparatus of claim 1, wherein at least one of said first and second securing sections is configured to engage in a non-positive fit connection.

6. The apparatus of claim 1, wherein at least one of said first and second securing sections is configured to engage in a positive fit connection.

7. The apparatus of claim 1, wherein said first securing section is inserted through a perforation in said support and said second securing section engages a cut-out opening of said profiled element.

8. The apparatus of any one of claim 1, wherein at least one of said first and second securing sections is snapped into a structure selected from the group consisting of said profiled element and said support.

9. The apparatus of any one of claim 1, wherein said first securing section extends through said perforation, wherein a distal end of said securing section engages a locking element, and wherein said second securing section engages a cut-out opening of said profiled element.

10. The apparatus of any one of claim 1, wherein said quick fastener is rotatable about a middle longitudinal axis thereof between a locking position and a release position.

11. The apparatus of claim 1, wherein said quick fastener is configured as a rotary locking apparatus that, in a locking position thereof, creates a non-positive fit connection.

12. The apparatus of claim 1, wherein said quick fastener is configured as a rotary locking apparatus that, in a locking position thereof, creates a positive fit connection.

13. The apparatus of claim 4, wherein said first securing section comprises a first locking section on a free-end thereof and said second securing section comprises a second locking section on a free end thereof, wherein said support comprises a flat section having a non-circular perforation, the cross-section of which permits said first locking section to be introduced through said perforation, wherein rotation of said quick fastener claims said second securing section, to said profiled element, wherein said profiled element comprises a profiling section that forms a cut-out opening, wherein said cut-out opening has a cross section that permits said second locking section to be detachably claimed to said profiled element by rotation of said second locking section, and wherein said second locking section forms a positive fit in said cut-out opening.

14. An apparatus comprising a transport device, said transport device comprising a conveyor, a front deflector, a rear deflector, a sliding strip, a profiled element, a support, and an entry finger, wherein said conveyor forms a loop that is driven to circulate so as carry items thereon in a transport direction from said rear deflector to said front deflector, wherein said conveyor changes its direction of travel as it is guided over said rear deflector and said front deflector, wherein said sliding strip is on said profiled element, wherein said conveyor slides along said sliding strip, wherein said profiled element connects to said support, wherein said entry finger guides said conveyor around said front deflector, wherein said entry finger is coupled to said transport device by a detachable connection that is selected from the group consisting of a first connection, a second connection, and a third connection, wherein said first connection is a locking connection that connects said entry finger to said sliding strip, wherein said second connection is an insertion connection that connects said entry finger to said profiled element, and wherein said third connection is a detachable connection formed by a quick fastener between said support and said profiled element and said finger, wherein said entry finger comprises a guide section having an upper side that forms a contact surface that provides said conveyor with a transition of between said front deflection apparatus and said sliding strip, wherein said entry finger comprises a contact section that is directly adjacent to said guide section, wherein said contact section comprises a locking element that forms a locking connection between said entry finger and said sliding strip, and wherein said contact section is configured so as to provide a lockable contact mount for said sliding strip.

15. The apparatus of claim 14, wherein said locking element is configured to engage a locking opening provided in said sliding strip and wherein said locking element is introduced into said locking opening and locked in a locking position.

16. The apparatus of claim 14, wherein said entry finger further comprises a receiving section that is immediately adjacent to said contact section, wherein said receiving section participates in forming said insertion connection.

17. The apparatus of claim 16, wherein said insertion connection is formed as a result of said receiving section having an outer geometry that conforms an inner geometry of said profiled element in such a way that said receiving section is received in positive fit by said profiled element.

18. The apparatus of any one of claim 16, wherein said receiving section, said contact section, and said guide section are offset in relation to one another to form of steps, each of which defines a stop surface.

19. The apparatus of claim 16, wherein said entry finger comprises an insertion section adjacent to said receiving section as a result of which said entry finger detachably connects to said quick fastener and wherein said detachable connection of said quick fastener with said entry finger is formed as either a non-positive fit or a positive fit.

20. The apparatus of claim 14, wherein said transporter has a front end, wherein the guide section comprises a free-face side that faces said front end, and wherein said free face side is rounded.

\* \* \* \* \*